UNITED STATES PATENT OFFICE.

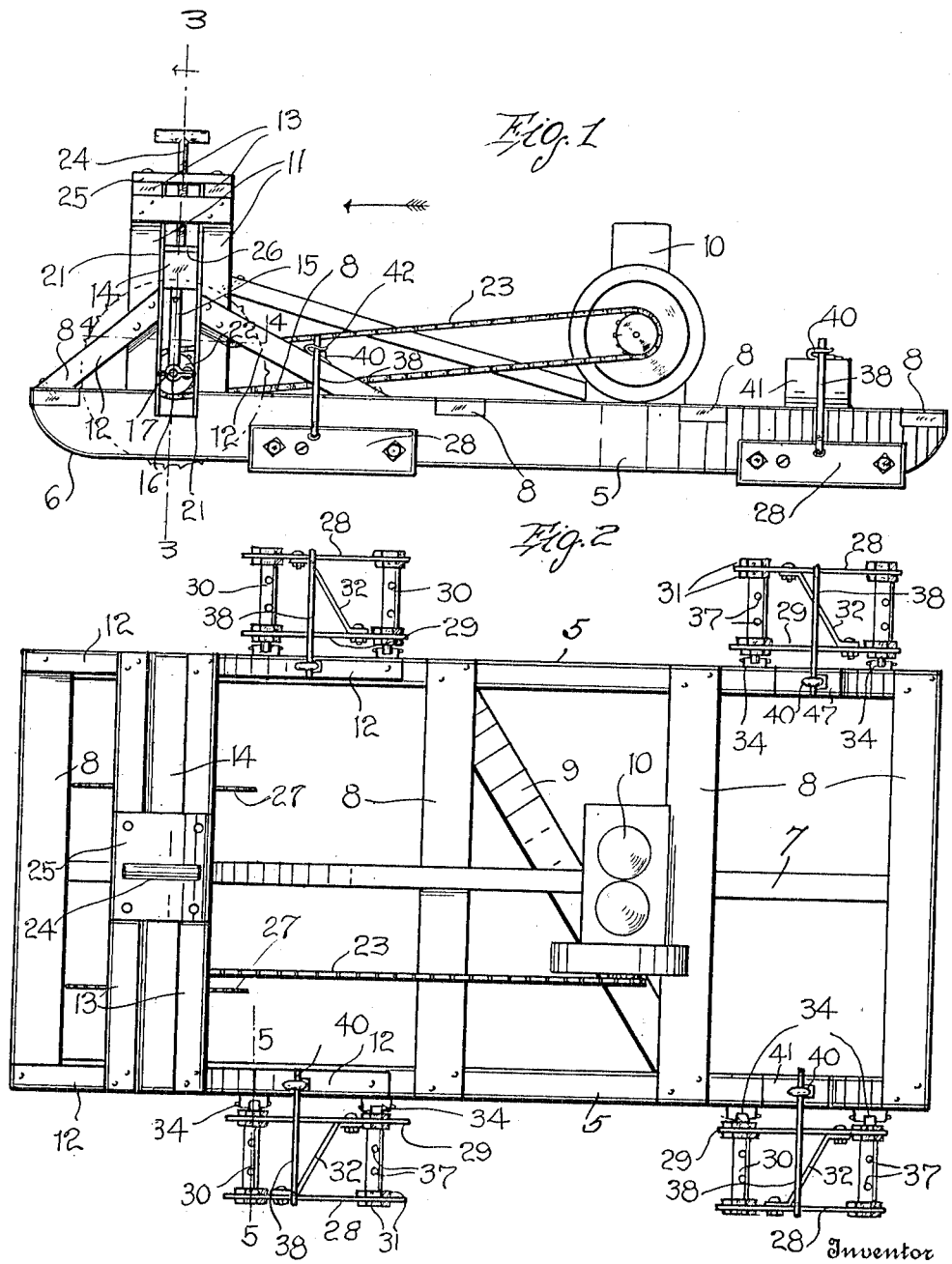

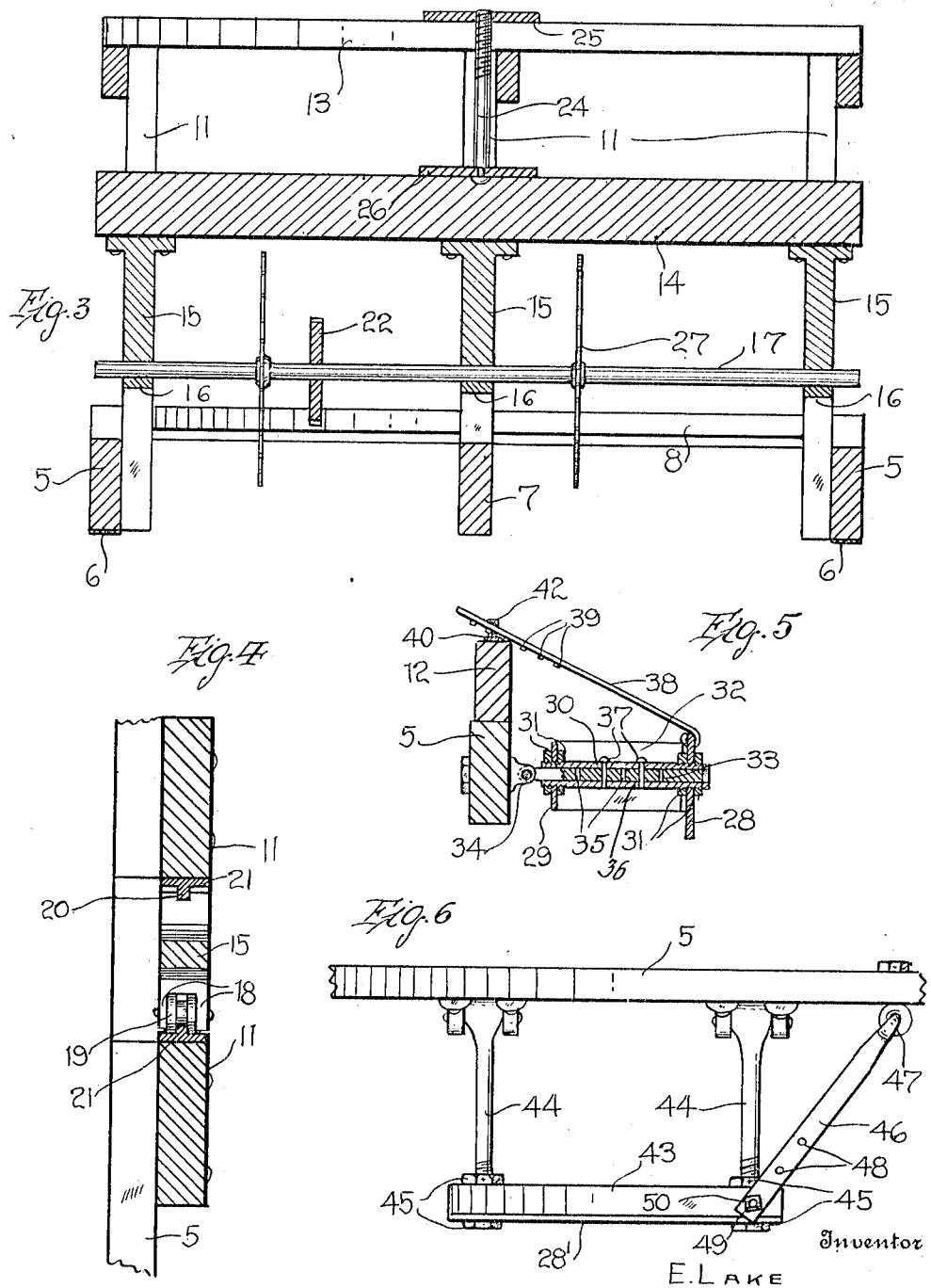

EUGENE LAKE, OF COOPERSTOWN, NEW YORK.

ICE-HARVESTING MACHINE.

1,102,277.  Specification of Letters Patent.  Patented July 7, 1914.

Application filed March 26, 1913. Serial No. 757,014.

*To all whom it may concern:*

Be it known that I, EUGENE LAKE, citizen of the United States, residing at Cooperstown, in the county of Otsego and State of New York, have invented certain new and useful Improvements in Ice-Harvesting Machines, of which the following is a specification, reference being had to the accompanying drawings.

This invention relates to ice harvesting machines and has for its primary object to provide improved means for mounting and quickly adjusting the saw-carrying shaft.

Another and more specific object of the invention resides in the provision of a body including parallel longitudinal runners, a guide frame mounted upon said body at its forward end, a saw shaft support vertically movable in the guide frame, means carried by said support and engaged with means upon the frame to prevent transverse movement of the support, and means mounted upon the frame and connected to the support to vertically adjust the latter.

The invention has for a further object the provision of a novel construction of gage and guide whereby the gage blade may be easily and quickly adjusted, and means for holding the gage in its operative or inoperative position.

A still further object of the invention is to generally improve and simplify the construction of machines of the above character, to reduce their manufacturing cost, and to provide a machine of great durability and high efficiency in practical use.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of an ice harvesting machine embodying the present invention. Fig. 2 is a top plan view thereof; Fig. 3 is a section taken on the line 3—3 of Fig. 1; Fig. 4 is a section taken on the line 4—4 of Fig. 1; Fig. 5 is a section taken on the line 5—5 of Fig. 2; and Fig. 6 is a detail fragmentary plan view illustrating a slightly modified construction of the gage.

Referring in detail to the drawings, 5 designates the parallel longitudinal skids or runners which are provided upon their lower edges with the metal shoes 6.

7 designates the central longitudinal runner, said runner and the side runners 5 being connected by a plurality of transverse rods 8. An obliquely disposed brace bar 9 connects adjacent transverse bars 8 and provides a support for the centrally located engine 10 which provides the power for the operation of the saw blade-carrying shaft.

Adjacent the forward end of the machine body, spaced uprights 11 are suitably secured at their lower ends to each of the runners 5 and 7, and the outer pairs of uprights are braced by the inclined bars 12. At their upper ends, the uprights 11 are connected by the parallel transverse bars 13. These several pairs of uprights constitute a guide frame for the shaft carrying beam 14 which is movable in a vertical plane between said uprights. This beam carries the spaced bearing standards 15, said standards being disposed between the uprights of each pair and provided upon their lower ends with the removable cap plates 16 whereby the saw blade-carrying shaft 17 may be readily mounted upon the lower ends of the bearing standards or removed therefrom. Each of these standards at its lower end and upon one side has integrally formed therewith, spaced ears 18 between which a peripherally grooved roller 19 is mounted. Upon the opposite side of the bearing standard, the same is provided with a vertical groove or recess 20. In the opposed edges of the uprights of the guide frame, metal strips 21 are secured. These strips which are arranged on the rear uprights are engaged by the grooved rollers 19 mounted upon the lower ends of the standards while the other metal strips 21 on the forward uprights are received in the grooves or recesses 20 of the bearing standards. It will thus be apparent that the shaft carrying beam and the bearing standards are held in the guide frame against transverse movement. The saw blade shaft is provided with a sprocket indicated at 22 which is connected by an endless drive chain 23 with a similar sprocket upon the engine shaft. In the operation of the machine, there is a rearward pull upon the saw blade shaft, and it is for this reason that the anti-friction rollers 19 are mounted upon the rear sides of the bearing standards. Thus friction is reduced to a minimum so that the shaft and saws carried thereby may be readily moved vertically in the guide frame.

24 designates an adjusting screw which is threaded in a plate 25 centrally fixed to the guide frame in which the saw-carrying shaft is mounted. The lower end of this screw is swiveled in a plate 26 fixed upon the beam 14. It will be readily understood that by simply turning the adjusting screw, the saw shaft carrying beam may be raised or lowered to position the saw blades indicated at 27 with relation to the surface of the ice field.

Upon each of the side runners 5 adjacent to the front and rear ends thereof, a gage is mounted to insure a cut of the desired width by the saw blades. This gage consists of a plate 28 and a second relatively narrow plate 29 which is disposed adjacent to the runner 5 and in spaced parallel relation to the plate 28. These plates are connected at their ends by the tubular rods 30, said rods being provided upon opposite ends with exterior screw threads to receive the nuts 31 which have clamping engagement with the plates 28 and 29. The outermost plate 28 is adapted for engagement and movement in a groove previously cut in the ice field by the saw and guides the movement of the machine so that a block of predetermined width will be cut. The lower edge of the inner blade 29 rests upon the surface of the ice and limits the downward movement of the plate 28. An obliquely disposed yieldable bracing plate 32 is arranged between the plates 28 and 29 and secured to the same at its ends. The nuts 31 may be adjusted upon the ends of the tubular rods to position the outermost plate 28 with relation to the runner 5 so that the width of the ice blocks cut by the saw blades may be varied when desired.

33 designates spaced rods which are pivotally mounted at one of their ends as indicated at 34 upon the runner 5. Each of these rods is provided with a series of spaced openings 35 which are adapted to register with the spaced openings 36 provided in the tubular rods 30 within which the rods 33 are disposed. Pins 37 are adapted to be inserted through these coinciding openings to secure the rods 33 and 30 together. It will thus be seen that a general adjustment of the gage plate with relation to the runner may be easily and quickly obtained by simply sliding the tubular rods upon the rods 33.

A rod 38 is pivotally connected at one of its ends to the gage plate 28 and is provided adjacent its other end with a plurality of rack teeth 39. These teeth are adapted to engage with the edge of a plate 40 mounted upon one of the inclined braces 12 of the uprights 11 of the guide frame for the saw shaft. Standards or supports 41 are also provided upon the rear ends of the runners upon which similar plates are arranged for engagement by the rods 38 connected to the rear gage devices. The plates 40 are bent upon themselves to provide resilient end portions 42 adapted for engagement with the rods 38 to hold the ratchet teeth thereof in engagement with the edges of the plates 40. It will thus be seen, that the gage plate may be raised or lowered and held in its operative or inoperative position by simply adjusting the notched or toothed portion of the rod 38 upon the plate 40.

In Fig. 6 of the drawings, I have illustrated a slightly modified form of the gage, wherein the same consists of the plate 28' arranged upon the outer side of the bar 43. The plate and bar are provided with coinciding openings to receive the outer threaded ends of the rods 44 which are pivotally mounted at their inner ends upon the runners 5. Clamping nuts 45 are threaded upon these rods to adjust the plate and bar longitudinally upon the rods and securely clamp the same in their adjusted positions. A bracing bar 46 is loosely connected at one of its ends to an eye 47 fixed to the runner 5 and is provided with a plurality of openings 48 in its other end to receive the upper end of a threaded bolt 49 mounted in the bar 43. A nut 50 is threaded upon the upper end of this bolt whereby the bracing bar is adjustably secured to the gage and said gage braced against longitudinal thrust. The same means for raising and lowering the gage is provided as above described in connection with the preferred form of this device. It will be understood, that if desired, the gage devices may also be mounted upon the central longitudinal runner 7. The saw blades 27 are secured to the shaft in any preferred manner for longitudinal adjustment thereon.

From the foregoing, it is believed that the construction and manner of operation of my improved ice harvesting machine will be clearly and fully understood. As the device comprises but few elements which are all of simple form, it will be obvious that the same can be manufactured at small cost. The machine is also highly durable in its construction and efficient and reliable in practical operation.

While I have shown and described the preferred construction and arrangement of the several parts, it will be obvious that the invention is susceptible of considerable modification therein without departing from the essential features or sacrificing any of the advantages thereof.

Having thus described the invention, what is claimed is:

1. In an ice harvesting machine, the combination with a body, of a guide frame mounted upon said body, a beam vertically adjustable in said frame, a saw blade carrying shaft mounted upon the beam, means mounted on said frame and connected to the beam to vertically adjust the shaft carried thereby, and operating means for said shaft mounted upon the body.

2. In an ice harvesting machine, the combination with a body, of a frame mounted thereon including spaced uprights, a beam vertically movable between said uprights, bearing standards carried by the beam, a saw blade carrying shaft mounted in said standards, means mounted upon the frame and connected to said beam to vertically adjust the same, means on the standards coöperating with means on said uprights to prevent transverse shifting movement of the beam, and operating means for the shaft mounted upon said body.

3. In an ice harvesting machine, the combination with a body, of spaced pairs of uprights mounted upon said body, a transversely disposed beam vertically movable between the uprights of each pair, bearings carried by the beam, a saw blade carrying shaft mounted in said bearings, a roller mounted upon each of the bearings, a vertically disposed guide strip secured to one of the uprights of each pair engaged by said rollers, means for vertically adjusting the beam between the uprights and operating means for said shaft mounted upon the body.

4. In an ice harvesting machine, the combination with a body, of a guide frame mounted upon said body, a transversely disposed beam vertically movable in the guide frame, bearings carried by said frame, a saw blade-carrying shaft mounted in the bearings, vertically disposed spaced metal guide strips arranged in pairs upon said frame, a grooved roller mounted upon each of the bearings to engage one of said guide strips, each bearing being also provided with a groove to receive the other guide strip, means for vertically adjusting the beam in said frame, and operating means for the shaft mounted upon the body.

In testimony whereof I hereunto affix my signature in the presence of two witnesses.

EUGENE LAKE.

Witnesses:
JENNIE J. BEADLE,
WALTER E. BEADLE.